United States Patent
Liu et al.

(10) Patent No.: US 9,497,799 B2
(45) Date of Patent: Nov. 15, 2016

(54) METHOD FOR CONTROLLING RF SIGNAL PROCESSING COMPONENTS AND COMMUNICATIONS APPARATUS UTILIZING THE SAME

(71) Applicant: MediaTek Inc., Hsin-Chu (TW)

(72) Inventors: Zhi-Yuan Liu, Taichung (TW);
Ting-Chang Huang, Taoyuan (TW);
Cheng-Wei Lan, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 76 days.

(21) Appl. No.: 14/504,757

(22) Filed: Oct. 2, 2014

(65) Prior Publication Data

US 2015/0099561 A1  Apr. 9, 2015

Related U.S. Application Data (60) Provisional application No. 61/886,864, filed on Oct. 4, 2013.

(51) Int. Cl.
*H04W 88/06* (2009.01)
*H04W 76/02* (2009.01)

(52) U.S. Cl.
CPC ........... *H04W 88/06* (2013.01); *H04W 76/026* (2013.01)

(58) Field of Classification Search
CPC .... H04W 4/02; H04W 76/026; H04W 88/06
USPC ............................ 455/418, 420, 552.1, 553.1
See application file for complete search history.

(56) References Cited

U.S. PATENT DOCUMENTS

| | | | |
|---|---|---|---|
| 8,222,969 B2 | 7/2012 | Nagai | |
| 8,594,050 B2 * | 11/2013 | Kesselman | H04W 88/06 370/327 |

FOREIGN PATENT DOCUMENTS

| | | |
|---|---|---|
| CN | 101052169 A | 10/2007 |
| CN | 101826884 A | 9/2010 |
| CN | 102144357 A | 8/2011 |
| CN | 102332929 A | 1/2012 |

* cited by examiner

*Primary Examiner* — Sam Bhattacharya
(74) *Attorney, Agent, or Firm* — McClure, Qualey & Rodack, LLP (57) ABSTRACT

A communications apparatus includes a first radio module including at least a first baseband signal processing device and a first radio transceiver, a second radio module including at least a second baseband signal processing device and a second radio transceiver, and an RF front-end circuit, coupled to the first radio module and the second radio module and including a plurality of RF signal processing components. A portion of the RF signal processing components capable of processing the RF signals of both the first and second radio modules are coupled to both the first and second radio modules for being shared by the first and second radio modules, and the first and second radio modules are capable of establishing a dedicated wireless connection, simultaneously, via the RF front-end circuit.

18 Claims, 10 Drawing Sheets

FIG. 10

METHOD FOR CONTROLLING RF SIGNAL PROCESSING COMPONENTS AND COMMUNICATIONS APPARATUS UTILIZING THE SAME

CROSS REFERENCE TO RELATED APPLICATIONS

This application claims the benefit of U.S. Provisional Application No. 61/886,864 filed 2013 Oct. 4 entitled "RF Component Re-use Structure in Dual Radio Communications System", the entire contents of which are hereby incorporated by reference.

BACKGROUND OF THE INVENTION

1. Field of the Invention

The invention relates to a communications apparatus, and more particularly to a communications apparatus capable of supporting dual-talk with shared RF signal processing components to reduce the manufacturing cost and simplify the antenna design.

2. Description of the Related Art

Wireless communications networks are widely deployed to provide various communications services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is a radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and the capacity in associated UMTS networks.

As the demand for mobile broadband access continues to increase, research and development continues to advance UMTS technologies so that they not only meet the growing demand for mobile broadband access, but advance and enhance user experience with mobile communications.

BRIEF SUMMARY OF THE INVENTION

Communications apparatuses and methods for controlling RF signal processing components in a communications apparatus are provided. An exemplary embodiment of a communications apparatus comprises a first radio module, a second radio module, and a radio frequency (RF) front-end circuit. The first radio module comprises at least a first baseband signal processing device and a first radio transceiver and provides at least a first wireless communications service in compliance with a first protocol. The second radio module comprises at least a second baseband signal processing device and a second radio transceiver and provides at least a second wireless communications service in compliance with a second protocol. The RF front-end circuit is coupled to the first radio module and the second radio module and comprises a plurality of RF signal processing components. A portion of the RF signal processing components capable of processing both a plurality of RF signals of the first radio module and a plurality of RF signals of the second radio module are coupled to both the first radio module and the second radio module for being shared by the first radio module and the second radio module. The first radio module and the second radio module are capable of establishing a dedicated wireless connection, simultaneously, via the RF front-end circuit.

An exemplary embodiment of a method for controlling RF signal processing components in a communications apparatus comprising a first radio module providing at least a first wireless communications service in compliance with a first protocol, a second radio module providing at least a second wireless communications service in compliance with a second protocol and an RF front-end circuit comprising a plurality of RF signal processing components comprises: coupling the RF signal processing components to the second radio module; further coupling a portion of the RF signal processing components to the first radio module, wherein the portion of the RF signal processing components are capable of processing both a plurality of RF signals of the first radio module and a plurality of RF signals of the second radio module and are shared by the first radio module and the second radio module; and determining which radio module to use the portion of shared RF signal processing components according to an operation state of the communications apparatus. When the communications apparatus operates in a dual connection state in which the first radio module and the second radio module establish a dedicated wireless connection, simultaneously, the first radio module uses the portion of shared RF signal processing components to establish a first dedicated wireless connection and the second radio module uses the remaining RF signal processing components to establish a second dedicated wireless connection.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
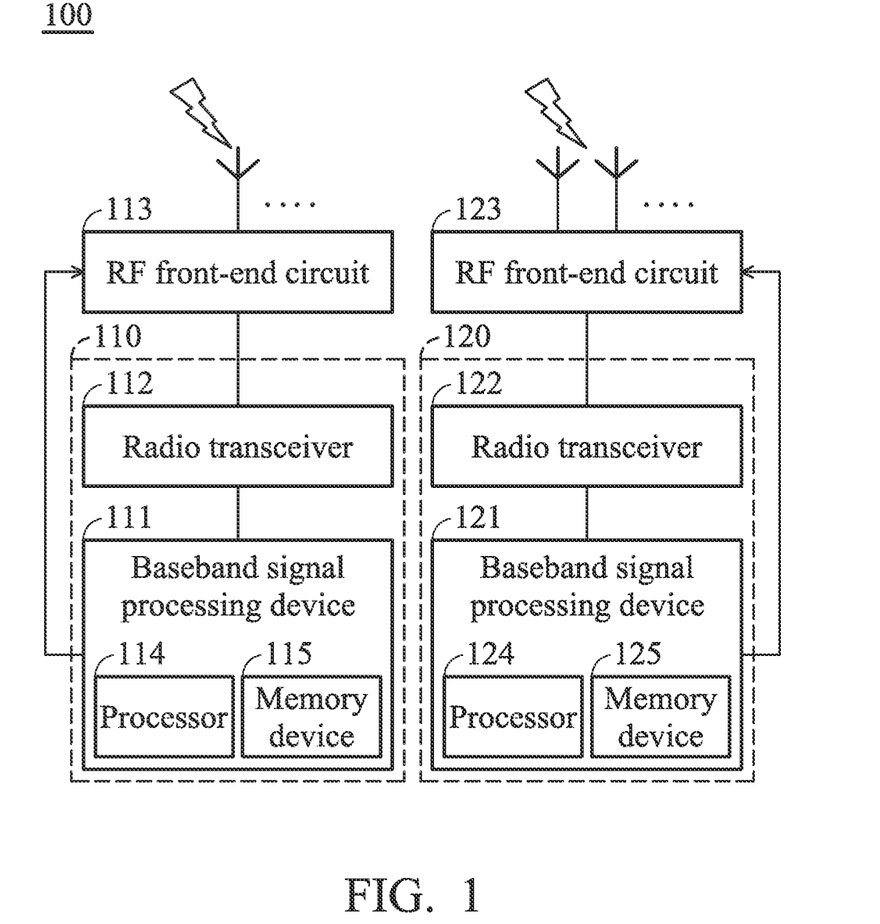
FIG. 1 is an exemplary block diagram of a communications apparatus with dual radio modules capable of supporting dual-standby and dual-talk.

FIG. 1 is an exemplary block diagram of a communications apparatus with dual radio modules capable of supporting dual-standby and dual-talk. For a communications apparatus with dual radio modules capable of supporting dual-standby, the radio modules comprised in the communications apparatus are capable of simultaneously operating in a standby mode to keep communicating with a corresponding wireless network and being standby for possible communication request to come. For a communications apparatus with dual radio modules capable of supporting dual-talk (also called dual-connection, simultaneous-communication, simultaneous-connection, etc. . . . ), the radio modules comprised in the communications apparatus are capable of simultaneously establishing a dedicated connection, such as a Circuit Switch (CS) connection, a Packet Switch (PS) connection, or others, with the corresponding wireless network.

For supporting dual-standby and dual-talk, the communications apparatus 100 may comprise two radio modules 110 and 120. The radio module 110 may at least comprise a baseband signal processing device 111 and a radio transceiver 112, and may be coupled to a dedicated radio frequency (RF) front-end circuit 113. The radio module 120 may at least comprise a baseband signal processing device 121 and a radio transceiver 122, and may be coupled to a dedicated RF front-end circuit 123.

The baseband signal processing device 111 may comprise a processor 114, a memory device 115, a plurality of hardware devices (not shown), firmware modules and software modules to perform baseband signal processing. The baseband signal processing may comprise Analog to Digital Conversion (ADC)/Digital to Analog Conversion (DAC), gain adjustment, modulation/demodulation, encoding/decoding, and so on. The processor 114 may control the operation of the baseband signal processing device 111, the radio transceiver 112 and the RF front-end circuit 113. The memory device 115 may store system and user data. The radio transceiver 112 may also comprise a plurality of hardware devices to perform RF conversion and RF signal processing. For example, the radio transceiver 112 may comprise a mixer, a filter, an amplifier, and so on. The RF front-end circuit 113 is coupled to the radio transceiver 112 for further processing the RF signals received from the radio transceiver 112 before being transmitted to the air interface and processing the RF signals received from the antenna(s).

Similarly, the baseband signal processing device 121 may comprise a processor 124, a memory device 125, a plurality of hardware devices (not shown), firmware modules and software modules to perform baseband signal processing. The baseband signal processing may comprise analog to digital conversion (ADC)/digital to analog conversion (DAC), gain adjustment, modulation/demodulation, encoding/decoding, and so on. The processor 124 may control the operation of the baseband signal processing device 121, the radio transceiver 122 and the RF front-end circuit 123. The memory device 125 may store system and user data. The radio transceiver 122 may also comprise a plurality of hardware devices to perform RF conversion and RF signal processing. For example, the radio transceiver 122 may comprise a mixer, a filter, an amplifier, and so on. The RF front-end circuit 123 is coupled to the radio transceiver 122 for further processing the RF signals received from the radio transceiver 122 before being transmitted to the air interface and processing the RF signals received from the antenna(s).

FIG. 1 shows the general design of a communications apparatus capable of supporting dual-standby and dual-talk. Generally, when a communications apparatus is designed to support dual-standby and dual-talk, each radio module has a dedicated RF front-end circuit so that the dedicated connection of one radio module will not be interfered with or interrupted by another radio module. However, it is not cost-efficient to use so many RF signal processing components and the difficulty of designing the antenna(s) is high since the low frequency resonance of the antennas will degrade the overall antenna performance. To solve these problems, novel structures and control methods of communications apparatuses with shared RF front-end circuit are proposed.

Figure 2:
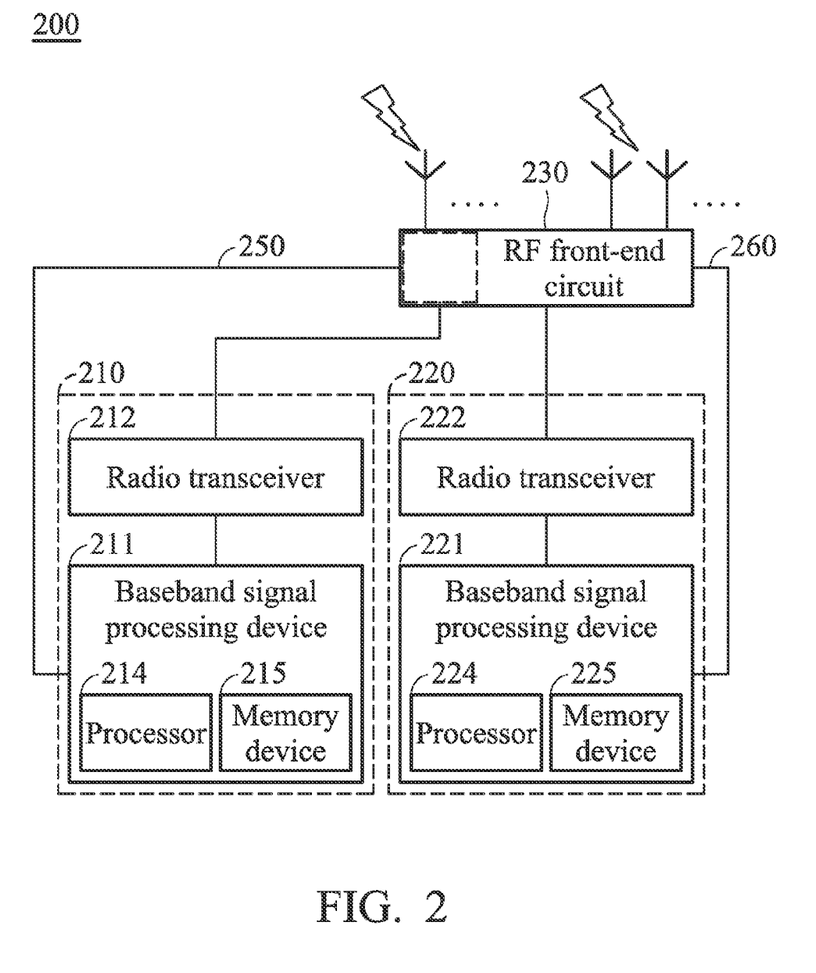
FIG. 2 shows an exemplary block diagram of a communications apparatus capable of supporting dual-standby and dual-talk according to an embodiment of the invention.

FIG. 2 shows an exemplary block diagram of a communications apparatus capable of supporting dual-standby and dual-talk according to an embodiment of the invention. The communications apparatus 200 may comprise two radio modules 210 and 220 and an RF front-end circuit 230. The radio module 210 may at least comprise a baseband signal processing device 211 and a radio transceiver 212 and provide at least a wireless communications service in compliance with a first protocol. The radio module 220 may at least comprise a baseband signal processing device 221 and a radio transceiver 222 and provide at least a wireless communications service in compliance with a second protocol. Note that in an embodiment of the invention, at least one of the radio modules (for example, radio module 220) is preferably capable of providing wireless communications service in compliance with a plurality of different protocols. To be more specific, at least one of the radio modules is preferably able to support more than one Radio Access Technology (RAT) of communications.

The baseband signal processing device 211 may comprise a processor 214, a memory device 215, and a plurality of hardware devices (not shown), firmware modules and software modules to perform baseband signal processing. The baseband signal processing may comprise analog to digital conversion (ADC)/digital to analog conversion (DAC), gain adjustments, modulation/demodulation, encoding/decoding, and so on. The processor 214 may control the operations of the baseband signal processing device 211, the radio transceiver 212 and the RF front-end circuit 230. The memory device 215 may store system and user data. The radio transceiver 212 may also comprise a plurality of hardware devices to perform RF conversion and RF signal processing. For example, the radio transceiver 212 may comprise a mixer, a filter, an amplifier, and so on.

Similarly, the baseband signal processing device 221 may comprise a processor 224, a memory device 225, and a plurality of hardware devices (not shown), firmware modules and software modules to perform baseband signal processing. The baseband signal processing may comprise analog to digital conversion (ADC)/digital to analog conversion (DAC), gain adjustments, modulation/demodulation, encoding/decoding, and so on. The processor 224 may control the operations of the baseband signal processing device 221, the radio transceiver 222 and the RF front-end circuit 230. The memory device 225 may store system and user data. The radio transceiver 222 may also comprise a plurality of hardware devices to perform RF conversion and RF signal processing. For example, the radio transceiver 222 may comprise a mixer, a filter, an amplifier, and so on.

The RF front-end circuit 230 is coupled to both the radio modules 210 and 220 and comprises a plurality of RF signal processing components (not shown in FIG. 2). According to an embodiment of the invention, a portion of the RF signal processing components (for example, the portion labeled by the dotted line) in the RF front-end circuit 230 are shared by the radio modules 210 and 220 and are capable of processing the RF signals of both the radio modules 210 and 220. The RF front-end circuit 230 may be configured external to the radio modules 210 and 220, and therefore, may be regarded as external RF signal processing components.

Note that in some embodiments of the invention, the processor 214 and/or 224 may be configured outside of the corresponding radio module 210/220, or there may be another processor (not shown) configured outside of the radio modules 210 and 220 for controlling the operations thereof. In addition, in some embodiments of the invention, the processor 214 and 224 may also be configured outside of the radio modules and integrated as one processor for controlling the operations of the radio modules 210 and 220 and the RF front-end circuit. Therefore, the invention should not be limited to the structure shown in FIG. 2 or any specific way of implementation.

Note further that in the embodiments of the invention, the baseband signal processing device and the radio transceiver comprised in one radio module may be implemented in different chips and communicate with each other via a specific interface disposed therebetween, or may be integrated into one chip, such as an SoC (system on chip), and connect to each other by internal wires. Therefore, the invention should not be limited to any specific implementation method. In addition, in the embodiments of the invention, the radio modules comprised in the proposed communications apparatus (such as the communications apparatus 200) may be implemented in different chips and communicate with each other via a specific interface disposed therebetween, or may be integrated into one chip, such as an SoC and connect to each other by internal wires. Therefore, the invention should not be limited to any specific implementation method.

Figure 3:
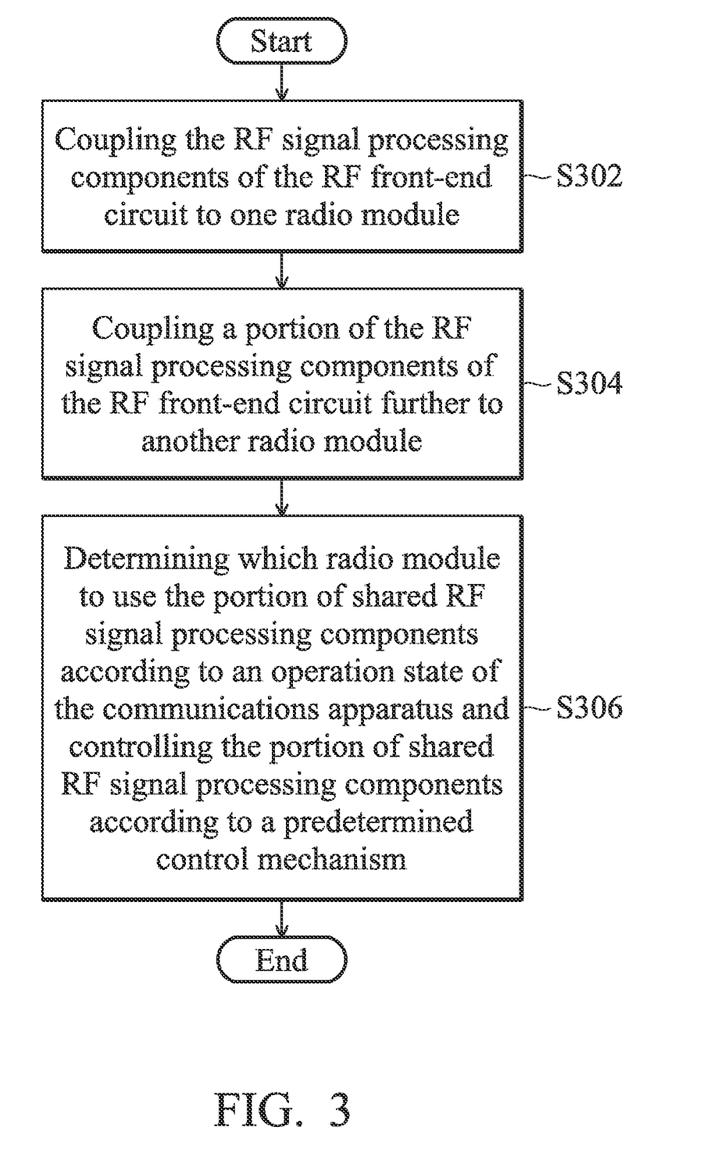
FIG. 3 shows a flow chart of a method for controlling RF signal processing components in a communications apparatus according to an embodiment of the invention.

FIG. 3 shows a flow chart of a method for controlling RF signal processing components in a communications apparatus according to an embodiment of the invention. First of all, the RF signal processing components of the RF front-end circuit are coupled to one radio module (for example, the radio module 220) (Step S302) and a portion of the RF signal processing components of the RF front-end circuit are further coupled to another radio module (for example, the radio module 210) co-located in the communications apparatus (Step S304) for being shared by both radio modules, where the portion of shared RF signal processing components are capable of processing RF signals of both the radio modules. Next, the processor (e.g. the processor either configured inside or outside of the radio modules) of the communications apparatus may further determine which radio module to use the portion of shared RF signal processing components according to an operation state of the communications apparatus, and the portion of shared RF signal processing components are controlled according to a predetermined control mechanism (Step S306) as will be further discussed in the following paragraphs. For example, when the communications apparatus operates in a dual connection state in which the radio modules 210 and 220 can simultaneously establish a dedicated wireless connection, radio module 210 may use the portion of shared RF signal processing components to establish a first dedicated wireless connection and radio module 220 may use the remaining RF signal processing components to establish a second dedicated wireless connection.

Note that in some embodiments of the invention, the structure shown in FIG. 2 and the control method shown in FIG. 3 may also be applied to a communications apparatus comprising more than two radio modules. In addition, in some embodiments of the invention, the radio modules comprised in the communications apparatus and sharing a portion of RF signal processing components may be the radio modules of cellular systems (for example, 2G, 3G, 4G . . . etc.) or may be radio modules of non-cellular systems (for example, WiFi, Bluetooth . . . etc.), and thus the invention should not be limited to any specific method of implementation.

Figure 4:
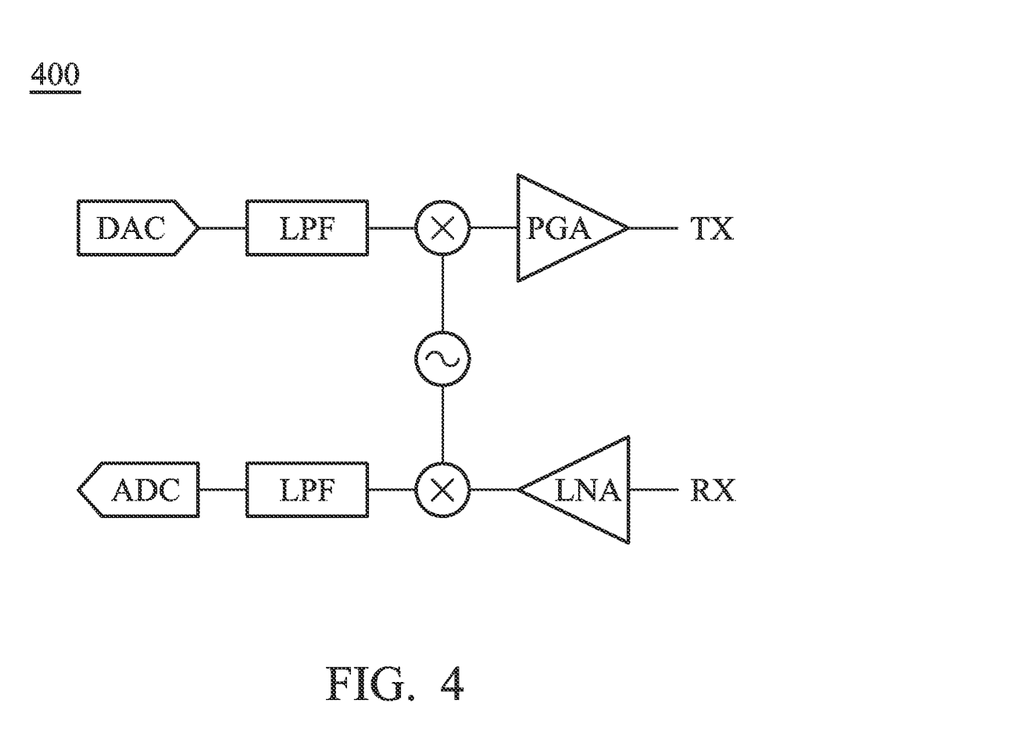
FIG. 4 shows an exemplary block diagram of a radio transceiver according to an embodiment of the invention.

FIG. 4 shows an exemplary block diagram of a radio transceiver according to an embodiment of the invention. In one embodiment of the invention, the radio transceiver 400 may comprise a transmission signal processing chain coupled to a transmission port TX and a reception signal processing chain coupled to a reception port RX. The transmission port TX and the reception port RX may be further coupled to the RF signal processing components of the RF front-end circuit.

The transmission signal processing chain may comprise a Digital to Analog Converter (DAC), a Low Pass Filter (LPF), a mixer and a Programmable Gain Amplifier (PGA). The reception signal processing chain may comprise an Analog to Digital Converter (ADC), a Low Pass Filter (LPF), a mixer and a Low Noise Amplifier (LNA). Note that FIG. 4 only shows one of a plurality of possible implementations of the radio transceiver. For example, in some embodiments of the invention, the ADC and DAC may be configured in the baseband signal processing device instead of the radio transceiver. Therefore, the invention should not be limited to any specific method of implementation.

Figure 5:
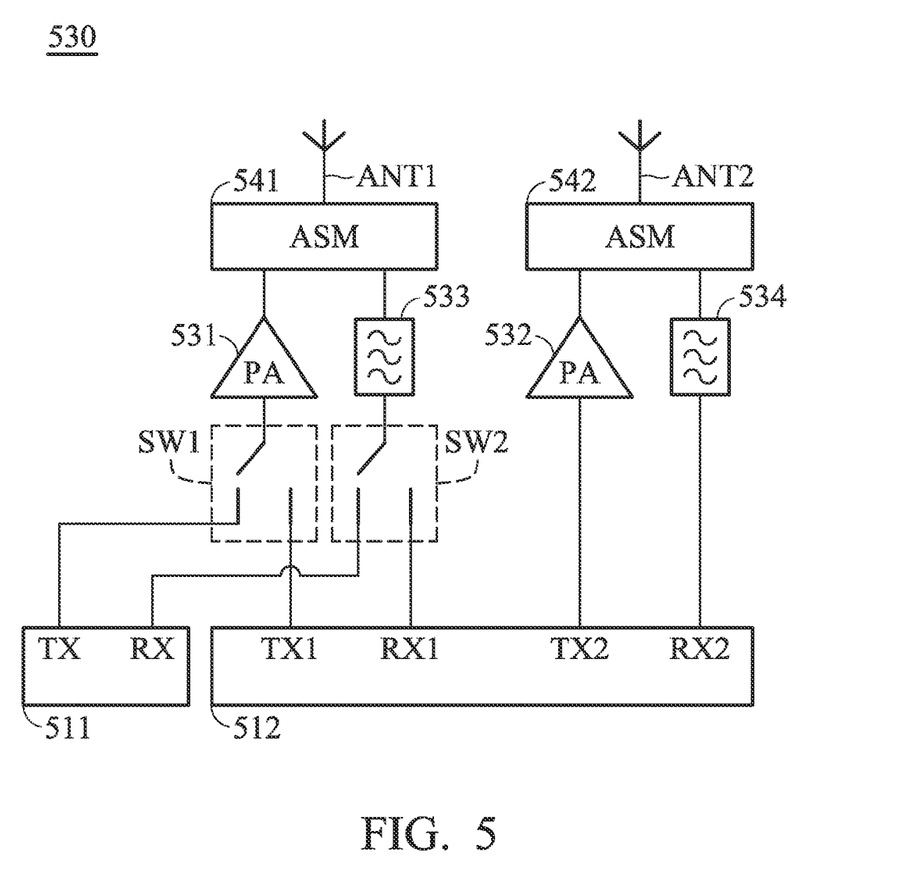
FIG. 5 shows an exemplary block diagram of an RF front-end circuit according to an embodiment of the invention.

FIG. 5 shows an exemplary block diagram of an RF front-end circuit according to an embodiment of the invention. Note that FIG. 5 is a simplified block diagram illustrating the concept of sharing and controlling the RF signal processing components. Therefore, the invention should not be limited thereto. According to an embodiment of the invention, the RF front-end circuit 530 may comprise power amplifiers PA 531 and 532, filters 533 and 534 and antenna switching modules (ASM) 541 and 542.

The PA 531 and filter 533 are shared by the radio transceivers 511 and 512 of different radio modules (for example, the radio modules 210 and 220 shown in FIG. 2). The PA 531 is selectively coupled to the transmission port TX of radio transceiver 511 or the transmission port TX1 of the radio transceiver 512 via the switch SW1. The filter 533 is selectively coupled to the reception port RX of the radio transceiver 511 or the reception port RX1 of radio transceiver 512 via the switch SW2.

The PA 532 and filter 534 are dedicatedly used by the radio transceiver 512. The PA 532 is coupled to another transmission port TX2 of the radio transceiver 512 and the filter 534 is coupled to another reception port RX2 of the radio transceiver 512.

Note that, unlike the general design as shown in FIG. 1, in which each radio transceiver has a dedicated RF front-end circuit for processing the RF signals thereof, in one of the embodiments shown in FIG. 5, a portion of the RF signal processing components in the RF front-end circuit are shared by the radio transceivers of the co-located radio modules. In this manner, the amount of required RF signal processing components is reduced as compared with the previous design. Therefore, in the embodiments of the invention, it is more cost efficient and the circuit area can also be reduced.

Figure 6:
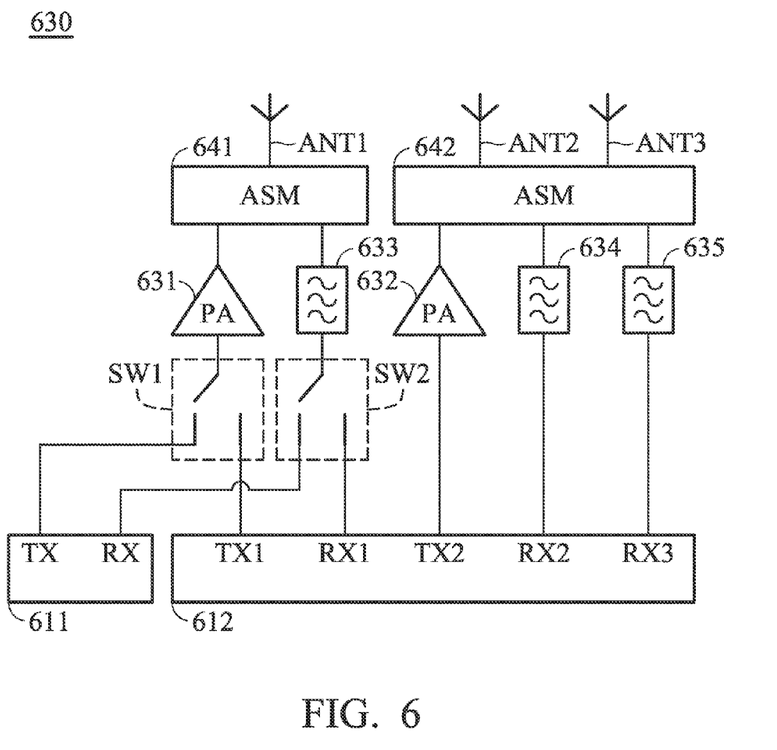
FIG. 6 shows another exemplary block diagram of an RF front-end circuit according to another embodiment of the invention.

FIG. 6 shows another exemplary block diagram of an RF front-end circuit according to another embodiment of the invention. The structure shown in FIG. 6 is similar to the one shown in FIG. 5, and the only difference is that, besides the PA 631 and 632, filters 633 and 634 and the ASMs 641 and 642, the communications apparatus may further comprise a diversity antenna and the RF front-end circuit 630 may further comprise a filter 635 coupled to the reception port RX3 of the radio transceiver 612 for diversity reception. The concepts of sharing and controlling the RF signal processing components shown in FIG. 6 are similar to those shown in FIG. 5. Therefore, for detailed descriptions, reference may be made to FIG. 5, and such descriptions are omitted here for brevity. Note that FIG. 6 is another simplified block diagram illustrating the concept of sharing and controlling the RF signal processing components, and the invention should not be limited thereto.

Several control mechanisms for controlling the portion of shared RF signal processing components are illustrated in the following paragraphs.

Figure 7:
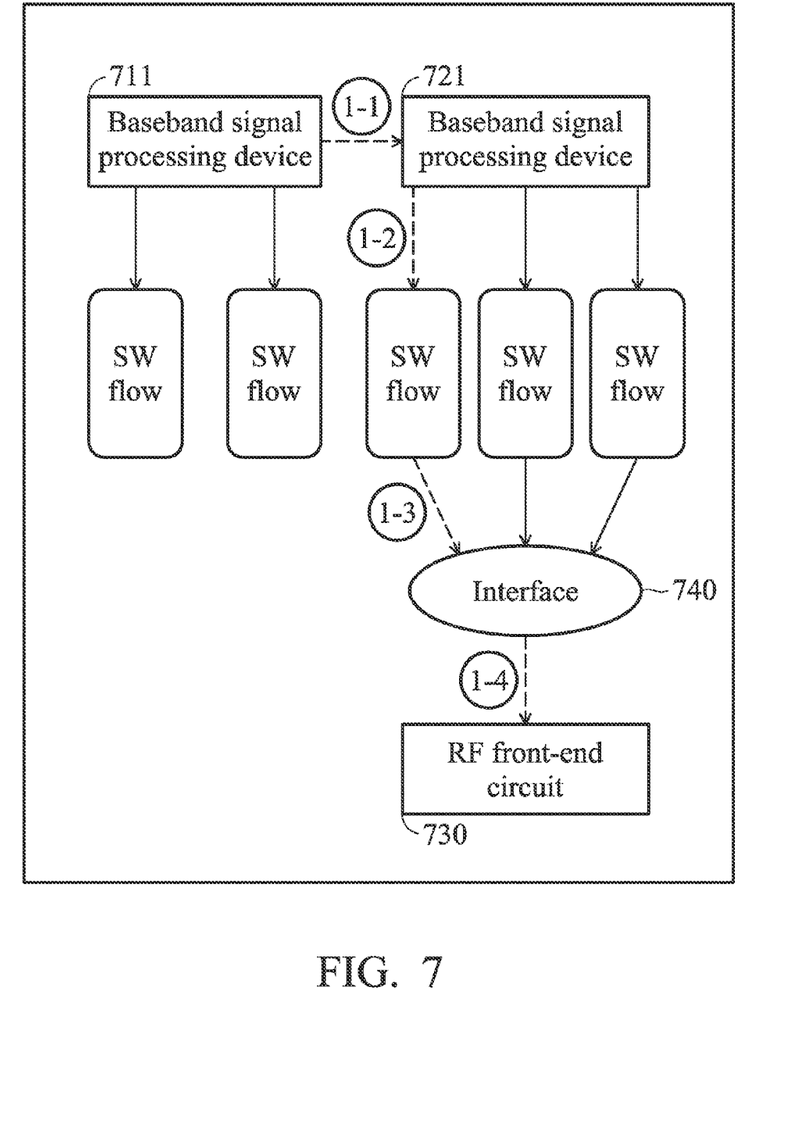
FIG. 7 is an exemplary schematic diagram showing the concept of controlling the portion of shared RF signal processing components according to an embodiment of the invention.

FIG. 7 is an exemplary schematic diagram showing the concept of controlling the portion of shared RF signal processing components according to an embodiment of the invention. According to a first embodiment of the invention, the radio module (for example, the radio module 210) may communicate with the other radio module (for example, the radio module 220) and transmit a control request to the other radio module for controlling the portion of shared RF signal processing components. After receiving the control request, and the radio module (for example, radio module 220) may control the portion of shared RF signal processing components according to the control request via an interface which is coupled to the RF front-end circuit and dedicatedly controlled by the radio module.

As shown in FIG. 7, the processor of the baseband signal processing device 711 of one radio module (for example, the radio module 210 shown in FIG. 2) may communicate with the processor of the baseband signal processing device 721 of the other radio module (for example, the radio module 220 shown in FIG. 2) and transmit a control request (Step 1-1, as shown) for controlling the portion of shared RF signal processing components. After receiving the control request, the processor of the baseband signal processing device 721 may execute a corresponding software flow (SW flow, which can be called a driver flow) (Step 1-2 as shown) to control an interface 740 coupled to the RF front-end circuit 730 (Step 1-3 as shown), thereby control the portion of shared RF signal processing components in the RF front-end circuit 730 via the interface 740 (Step 1-4 as shown). In brief, in the first embodiment of the invention, the baseband signal processing device 711 may control the portion of shared RF signal processing components through the baseband signal processing device 721.

According to an embodiment, the interface 740 (or, the interface 260 shown in FIG. 2) may be a General-purpose input/output (GPIO) interface, a Mobile Industry Processor Interface (MIPI), an Inter-Integrated Circuit (I2C) interface, a Serial Peripheral Interface (SPI), or others. In addition, in the embodiment of the invention, the SW flow executed by the processor may be a controlling flow for controlling the RF signal processing components (for example, setting parameters for the RF signal processing components, turning on or off the RF signal processing components, etc. . . . ).

Figure 8:
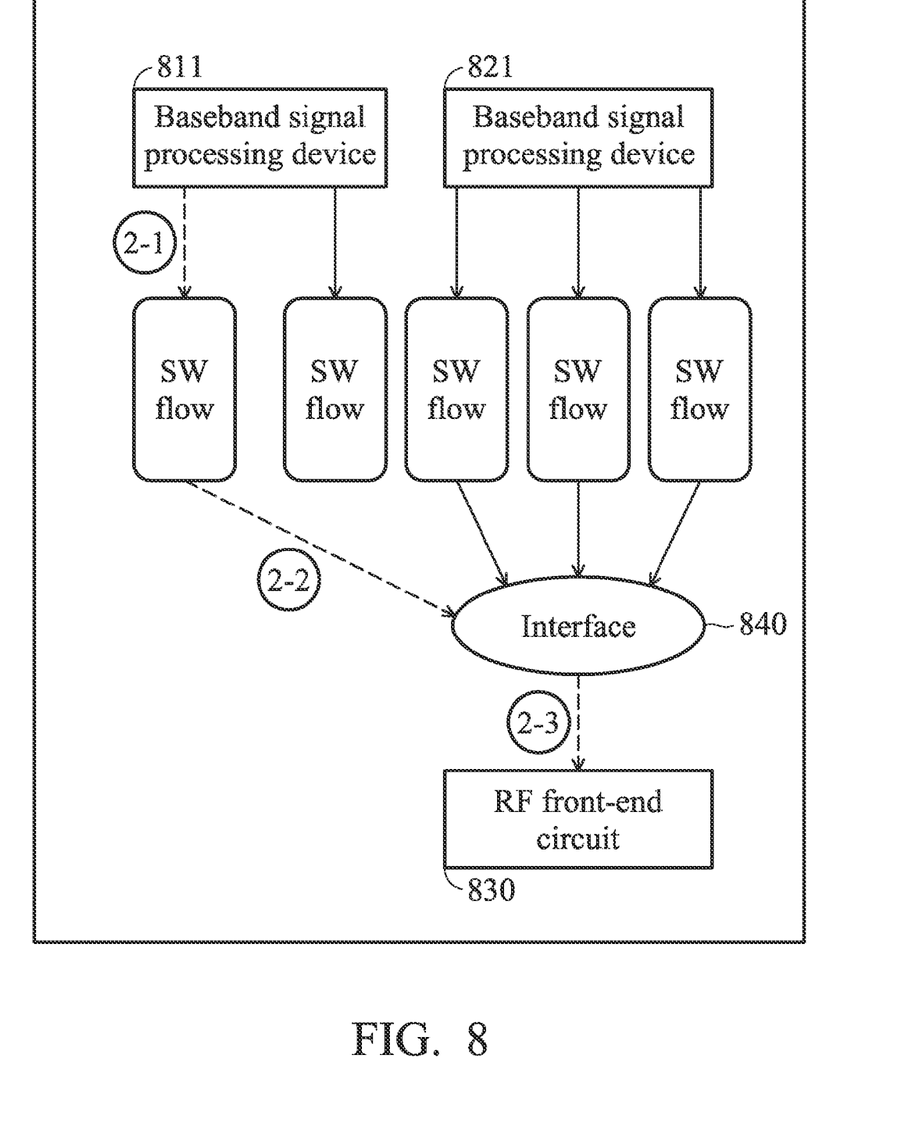
FIG. 8 is an exemplary schematic diagram showing the concept of controlling the portion of shared RF signal processing components according to another embodiment of the invention.

FIG. 8 is an exemplary schematic diagram showing the concept of controlling the portion of shared RF signal processing components according to another embodiment of the invention. According to a second embodiment of the invention, a shared interface may be coupled between the radio modules and the RF front-end circuit and controlled by both radio modules. In this manner, the radio modules may control the portion of shared RF signal processing components via the shared interface. In this embodiment, an extra switch may be introduced between the radio modules and the shared interface for selecting one radio module to be coupled to the shared interface.

For example, as shown in FIG. 8, the processor of the baseband signal processing device 811 of one radio module (for example, the radio module 210 shown in FIG. 2) may execute a corresponding software flow (Step 2-1 as shown) to control the shared interface 840 (Step 2-2 as shown), and thereby control the portion of shared RF signal processing components in the RF front-end circuit 830 via the shared interface 840 (Step 2-3 as shown). In brief, in the second embodiment of the invention, the baseband signal processing device 811 may directly control the portion of shared RF signal processing components via the shared interface 840.

According to an embodiment, the interface 840 (or, the interface 250/260 shown in FIG. 2) may be a GPIO interface, a MIPI, an I2C interface, an SPI, or others. In addition, in the embodiment of the invention, the SW flow executed by the processor may be a controlling flow for controlling the RF signal processing components (for example, setting parameters for the RF signal processing components, turning on or off the RF signal processing components, etc. . . . ).

Figure 9:
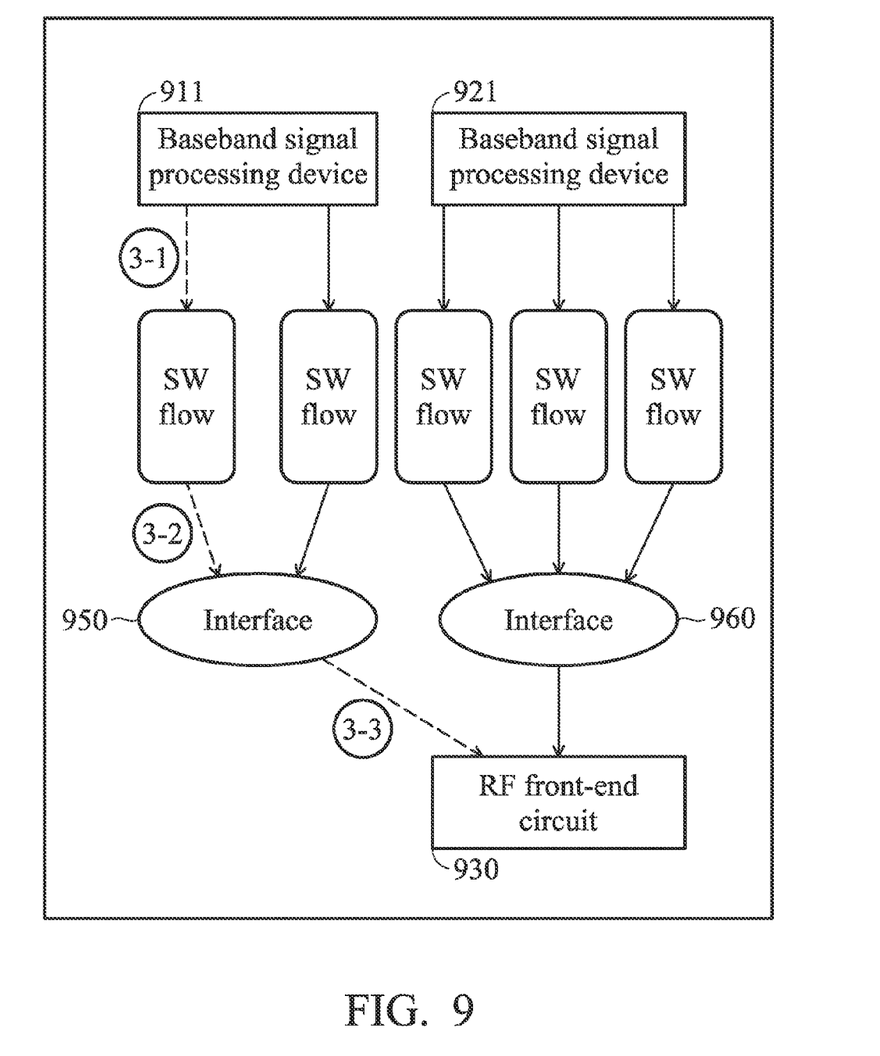
FIG. 9 is an exemplary schematic diagram showing the concept of controlling the portion of shared RF signal processing components according to yet another embodiment of the invention.

FIG. 9 is an exemplary schematic diagram showing the concept of controlling the portion of shared RF signal processing components according to yet another embodiment of the invention. According to a third embodiment of the invention, each radio module may have a dedicated interface for controlling the RF front-end circuit. In this manner, the radio modules may control the portion of shared RF signal processing components via their own interfaces. In this embodiment, an extra switch may be introduced between the interfaces and the RF front-end circuit for selecting one interface to be coupled to the RF front-end circuit.

For example, as shown in FIG. 9, the processor of the baseband signal processing device 911 of one radio module (for example, the radio module 210 shown in FIG. 2) may execute a corresponding software flow (Step 3-1 as shown) to control the dedicated interface 950 (Step 3-2 as shown), and thereby control the portion of shared RF signal processing components in the RF front-end circuit 330 via the dedicated interface 940 (Step 3-3 as shown). In brief, in the third embodiment of the invention, the baseband signal processing device 911 may directly control the portion of shared RF signal processing components via the interface 950 dedicatedly controlled by itself.

According to an embodiment, the interfaces 940 and 960 (or, the interfaces 250 and 260 shown in FIG. 2) may be a GPIO interface, a MIPI, an I2C interface, an SPI, or others. In addition, in the embodiment of the invention, the SW flow executed by the processor may be a controlling flow for controlling the RF signal processing components (for example, setting parameters for the RF signal processing components, turning on or off the RF signal processing components, etc. . . . ).

Referring back to FIG. 2, in some embodiments of the invention, when the communications apparatus 200 operates in a dual connection state in which the radio modules 210 and 220 are required to establish a dedicated wireless connection, simultaneously, the radio module 210 may use the portion of shared RF signal processing components to establish a dedicated wireless connection based on one of the control mechanisms as illustrated above, and the radio module 220 may control the remaining RF signal processing components in the RF front-end circuit 230 via the interface 260 coupled thereto and use the remaining RF signal processing components to establish another dedicated wireless connection. When the communications apparatus 200 does not operate in a dual connection state, such as when the communications apparatus 200 operates in a single connection state in which only the radio module 210 is required to establish a dedicated wireless connection, the radio module 210 may directly use the portion of shared RF signal processing components to establish the dedicated wireless connection based on one of the control mechanisms as illustrated above. On the other hand, when the communications apparatus 200 operates in a single connection state in which only the radio module 220 is required to establish a dedicated wireless connection, the radio module 220 may directly control the RF signal processing components in the RF front-end circuit 230 via the interface 260 coupled thereto and use the RF signal processing components to establish the dedicated wireless connection.

In addition, in the embodiments of the invention, the communications apparatus 200 may comprise a plurality of antennas, and the antennas may be designed to support different frequency ranges, such that not all the antennas have to support the full operation frequency range including the low frequency range, and the low frequency resonance problem in the previous design can be resolved.

Figure 10:
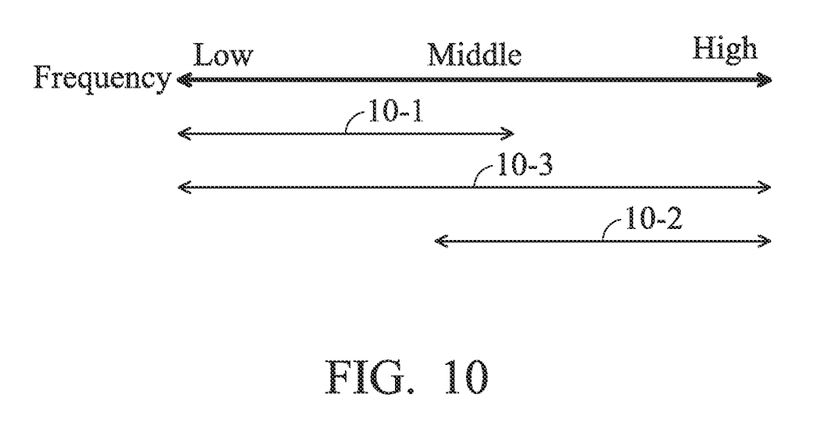
FIG. 10 is an exemplary schematic diagram showing exemplary frequency ranges supported by different antennas comprised in the proposed communications apparatus according to an embodiment of the invention.

FIG. 10 is an exemplary schematic diagram showing exemplary frequency ranges supported by different antennas comprised in the proposed communications apparatus according to an embodiment of the invention. The supported frequency range (or, the operation frequency range) of a communications apparatus may be mainly divided into three parts, including the low frequency part, middle frequency part and the high frequency part. As well known in the art, there may be various ways to divide the supported frequency range. For example, the supported frequency range may be divided into three equal parts, or may be divided into three unequal parts. Therefore, FIG. 10 only shows a concept of the invention and the invention should not be limited thereto.

According to an embodiment of the invention, the line 10-1 may represent the frequency range supported by the first main antenna ANT 1 shown in FIG. 5 and FIG. 6, the line 10-2 may represent the frequency range supported by the second main antenna ANT 2 shown in FIG. 5 and FIG. 6, and the line 10-3 may represent the frequency range supported by the diversity antenna ANT 3 shown in FIG. 6.

In the embodiments of the invention, since the RF signal processing components are well-organized for those capable of processing RF signals in the low frequency range are gathered together such as the shared RF signal processing components as shown in FIG. 5 and FIG. 6, not all the antennas have to support the low frequency range as shown in FIG. 10. In this manner, the risk of designing the antennas can be reduced as compared with the previous design and the low frequency resonance of the antennas will not degrade the overall antenna performance. In addition, the cost and circuit area of using the antennas can also be reduced as compared with the previous design. In addition, since a portion of the RF signal processing components are gathered together and shared by different radio modules, in the embodiments of the invention, it is more cost efficient and the circuit area of the RF front-end circuit can also be reduced as compared with the previous design.

Note that the concept of gathering the RF signal processing components for processing RF signals in the low frequency range to reduce the amount of required RF signal processing components and also simplify the antenna design is only one of a plurality of possible embodiments of the invention. Those who are skilled in this technology can still make various alterations and modifications without departing from the scope and spirit of this invention. Therefore, the scope of the present invention shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a first radio module, comprising at least a first baseband signal processing device and a first radio transceiver and providing at least a first wireless communications service in compliance with a first protocol; and
   a second radio module, comprising at least a second baseband signal processing device and a second radio transceiver and providing at least a second wireless communications service in compliance with a second protocol; and
   a radio frequency (RF) front-end circuit, coupled to the first radio module and the second radio module and comprising a plurality of RF signal processing components,
   wherein a portion of the RF signal processing components capable of processing both a plurality of RF signals of the first radio module and a plurality of RF signals of the second radio module are coupled to both the first radio module and the second radio module for being shared by the first radio module and the second radio module, and wherein the first radio module and the second radio module are capable of establishing a dedicated wireless connection, simultaneously, via the RF front-end circuit.

2. The communications apparatus as claimed in claim 1, wherein the RF front-end circuit is configured external to the first radio module and the second radio module, and the portion of shared RF signal processing components comprise at least a power amplifier, a filter and an antenna switching module.

3. The communications apparatus as claimed in claim 1, wherein the RF front-end circuit at least comprises:
   a first power amplifier, coupled to both the first radio transceiver and the second radio transceiver;
   a first filter, coupled to both the first radio transceiver and the second radio transceiver;
   a second power amplifier, coupled to the second radio transceiver; and
   a second filter, coupled to the second radio transceiver.

4. The communications apparatus as claimed in claim 1, wherein the first radio module transmits a control request to the second radio module for controlling the portion of shared RF signal processing components, and the second radio module controls the portion of shared RF signal processing components according to the control request via an interface coupled to the RF front-end circuit and controlled by the second radio module.

5. The communications apparatus as claimed in claim 1, wherein the first radio module controls the portion of shared RF signal processing components via an interface coupled to the portion of shared RF signal processing components.

6. The communications apparatus as claimed in claim 5, wherein the interface is coupled between the first radio module and the RF front-end circuit.

7. The communications apparatus as claimed in claim 5, wherein the interface is coupled to the first radio module, the second radio module and the RF front-end circuit.

8. The communications apparatus as claimed in claim 5, wherein the interface is controlled by both the first radio module and the second radio module.

9. The communications apparatus as claimed in claim 4, wherein the interface is a General-purpose input/output (GPIO) interface, a Mobile Industry Processor Interface (MIPI), an Inter-Integrated Circuit (I2C) interface, or a Serial Peripheral Interface (SPI).

10. The communications apparatus as claimed in claim 1, further comprising a first antenna and a second antenna coupled to the RF front-end circuit, wherein the first antenna and the second antenna support different frequency ranges.

11. A method for controlling RF signal processing components in a communications apparatus, wherein the communications apparatus comprises a first radio module providing at least a first wireless communications service in compliance with a first protocol, a second radio module providing at least a second wireless communications service in compliance with a second protocol and an RF front-end circuit comprising a plurality of RF signal processing components, the method comprising:

coupling the RF signal processing components to the second radio module;

coupling a portion of the RF signal processing components further to the first radio module, wherein the portion of the RF signal processing components are capable of processing both a plurality of RF signals of the first radio module and a plurality of RF signals of the second radio module and are shared by the first radio module and the second radio module; and determining which radio module to use the portion of shared RF signal processing components according to an operation state of the communications apparatus, wherein when the communications apparatus operates in a dual connection state in which the first radio module and the second radio module establish a dedicated wireless connection, simultaneously, the first radio module uses the portion of shared RF signal processing components to establish a first dedicated wireless connection and the second radio module uses the remaining RF signal processing components to establish a second dedicated wireless connection.

12. The method as claimed in claim 11, wherein when the first radio module is determined to use the portion of shared RF signal processing components, the method further comprises:
   transmitting a control request, by the first radio module, for controlling the portion of shared RF signal processing components to the second radio module; and
   controlling, by the second radio module, the portion of shared RF signal processing components according to the control request via an interface.

13. The method as claimed in claim 12, wherein the interface is coupled between the second radio module and the RF front-end circuit and is dedicatedly controlled by the second radio module.

14. The method as claimed in claim 11, wherein when the first radio module is determined to use the portion of shared RF signal processing components, the method further comprises:
   controlling, by the first radio module, the portion of shared RF signal processing components via an interface.

15. The method as claimed in claim 14, wherein the interface is coupled between the first radio module and the RF front-end circuit and is dedicatedly controlled by the first radio module.

16. The method as claimed in claim 14, wherein the interface is coupled to the first radio module, the second radio module and the RF front-end circuit and is controlled by both the first radio module and the second radio module.

17. The method as claimed in claim 12, wherein the interface is a General-purpose input/output (GPIO) interface, a Mobile Industry Processor Interface (MIPI), an Inter-Integrated Circuit (I2C) interface, or a Serial Peripheral Interface (SPI).

18. The method as claimed in claim 14, wherein the interface is a General-purpose input/output (GPIO) interface, a Mobile Industry Processor Interface (MIPI), an Inter-Integrated Circuit (I2C) interface, or a Serial Peripheral Interface (SPI).

* * * * *